United States Patent
Pakker

(10) Patent No.: US 6,644,083 B2
(45) Date of Patent: Nov. 11, 2003

(54) SPIN FORMING A TUBULAR WORKPIECE TO FORM A RADIAL FLANGE ON A TUBULAR FLANGE AND A BEAD OR THICK RIM ON THE RADIAL FLANGE

(75) Inventor: Ulrich Pakker, Seattle, WA (US)

(73) Assignee: MacDonald-Miller Incorporated, Seattle, WA (US)

( * ) Notice: Subject to any disclaimer, the term of this patent is extended or adjusted under 35 U.S.C. 154(b) by 66 days.

(21) Appl. No.: 09/800,277

(22) Filed: Mar. 6, 2001

(65) Prior Publication Data

US 2001/0054822 A1 Dec. 27, 2001

Related U.S. Application Data

(60) Provisional application No. 60/212,399, filed on Jun. 19, 2000.

(51) Int. Cl.$^7$ ................................................. B21D 19/12
(52) U.S. Cl. .................. 72/86; 72/83; 72/85; 72/379.2; 29/890.15
(58) Field of Search ................................ 72/82, 83, 84, 72/85, 86, 101, 107, 379.2; 29/890.14, 890.15

(56) References Cited

U.S. PATENT DOCUMENTS

| | | | | |
|---|---|---|---|---|
| 2,941,289 A | * | 6/1960 | Chace | 72/86 |
| 3,333,449 A | * | 8/1967 | Rebsamen | 72/93 |
| 4,606,206 A | * | 8/1986 | Daudi | 72/83 |
| 6,289,706 B1 | * | 9/2001 | Hermanson | 72/82 |

* cited by examiner

Primary Examiner—Ed Tolan
(74) Attorney, Agent, or Firm—Delbert J. Barnard

(57) ABSTRACT

A cylindrical workpiece (20) is mounted onto and connected to a mandrel (14) that is itself mounted for rotation about a vertical axis (12). A first end portion of the workpiece (20) is housed within the mandrel (14). A second end portion projects axially outwardly beyond a radial forming surface (60) on the mandrel (14). A first forming roller (30) is mounted on a swing post (52) that is positioned by an adjustable length strut (56). The strut (56) is elongated to swing the post (52) downwardly and place the roller (30) inside the second end portion of the workpiece (20). Then, a lead screw (28) is used for pulling on a base (50) that supports the post (52). This pulls a convex face portion (32) of the roller (30) against the inside of the second end portion of the workpiece (20). Lead screw operation moves the roller (30), causing it to stretch the second end portion of the workpiece (20) and move it up onto and then move it radially outwardly along the forming surface (60). The movement of the roller (30) can be stopped before the roller (30) passes the outer diameter of the forming surface (60). Then, a second forming roller end cam can be used to bend the outer end part of the workpiece radially inwardly and then flat against an adjoining portion of the workpiece (20) that is in contact with the forming surface (60). Or, the roller (30) can be moved radially outwardly until it moves past the outer diameter of the forming surface (60).

15 Claims, 15 Drawing Sheets

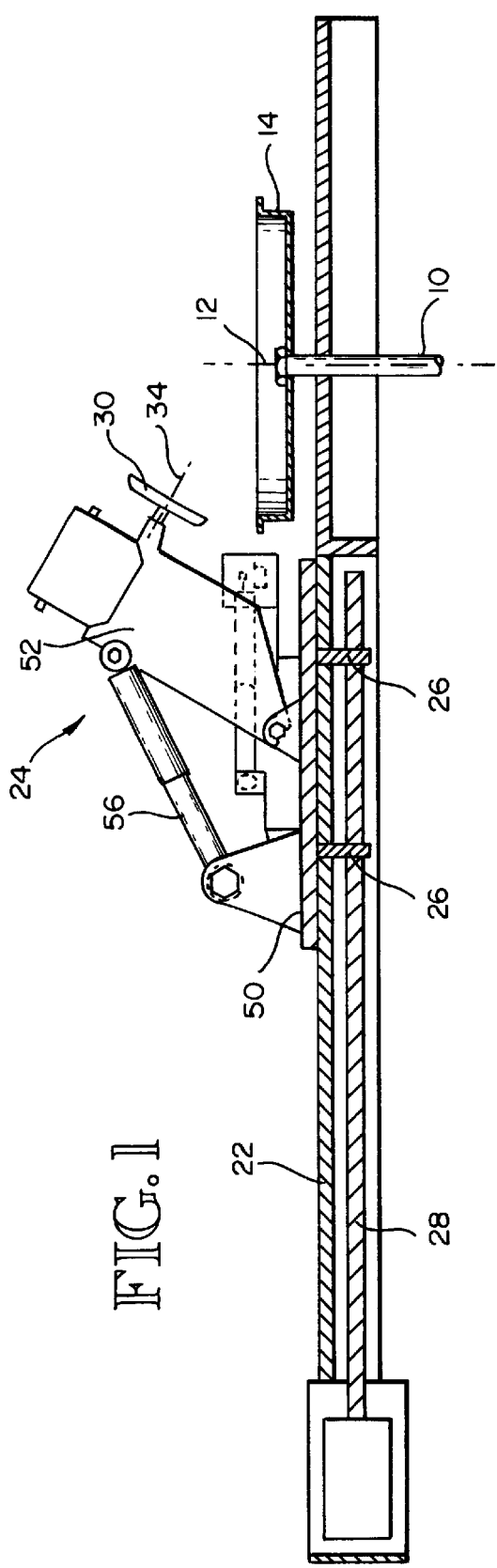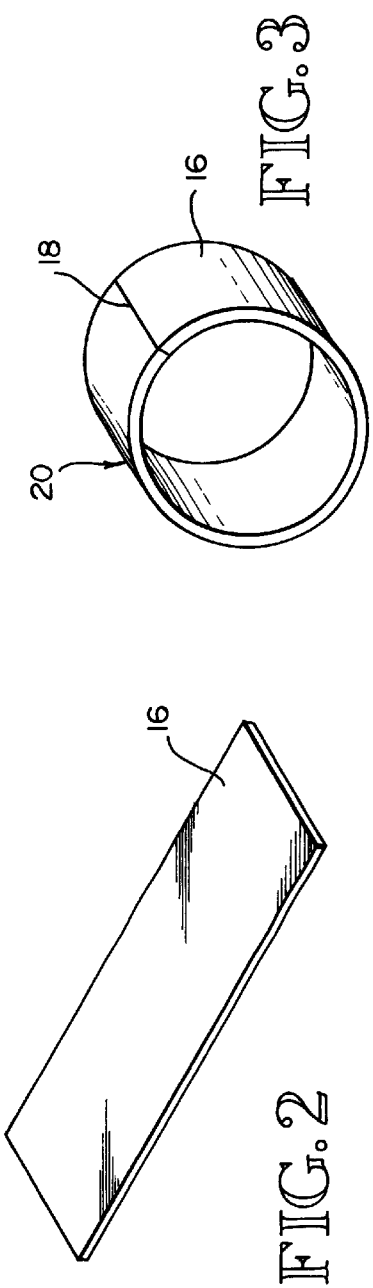

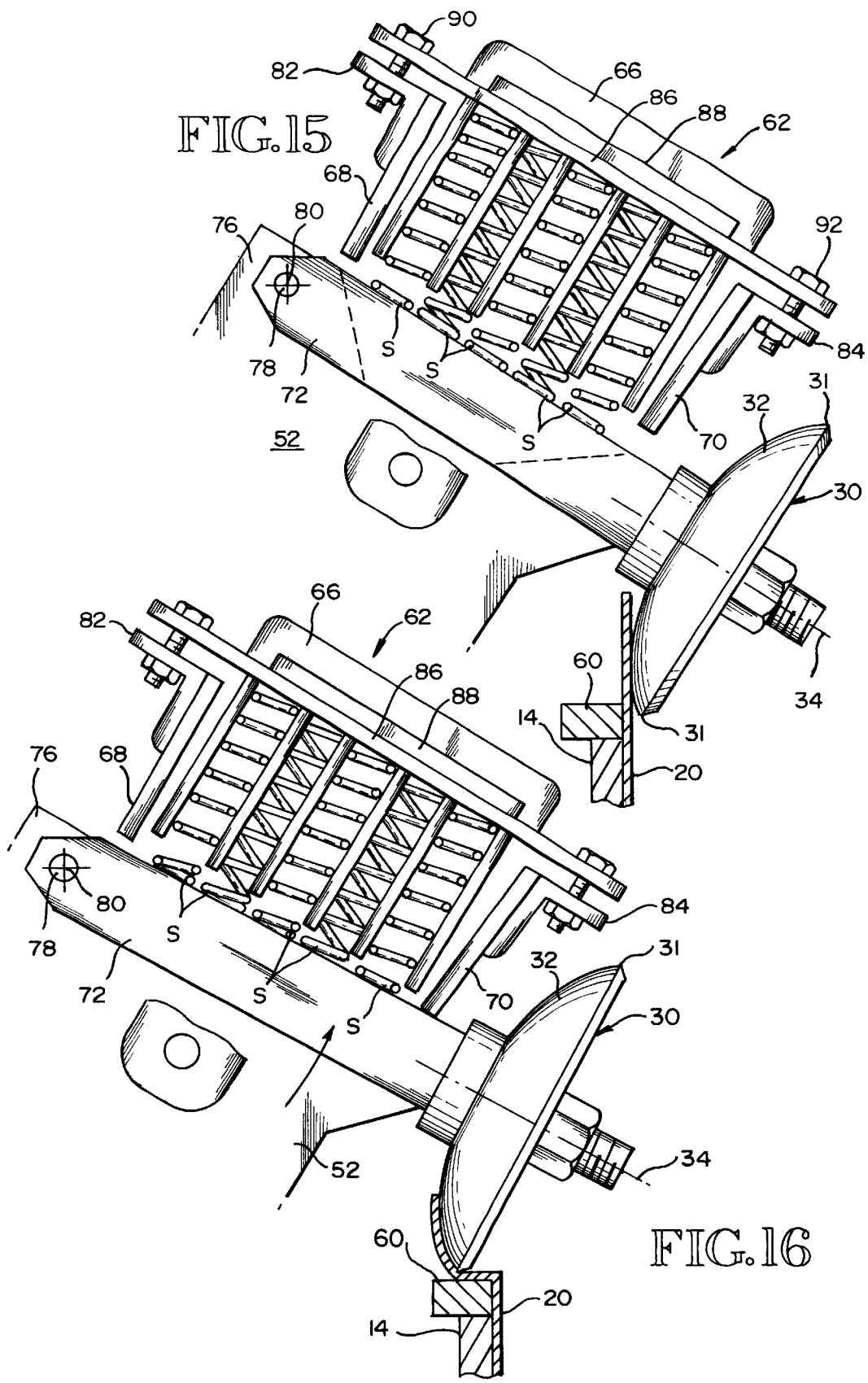

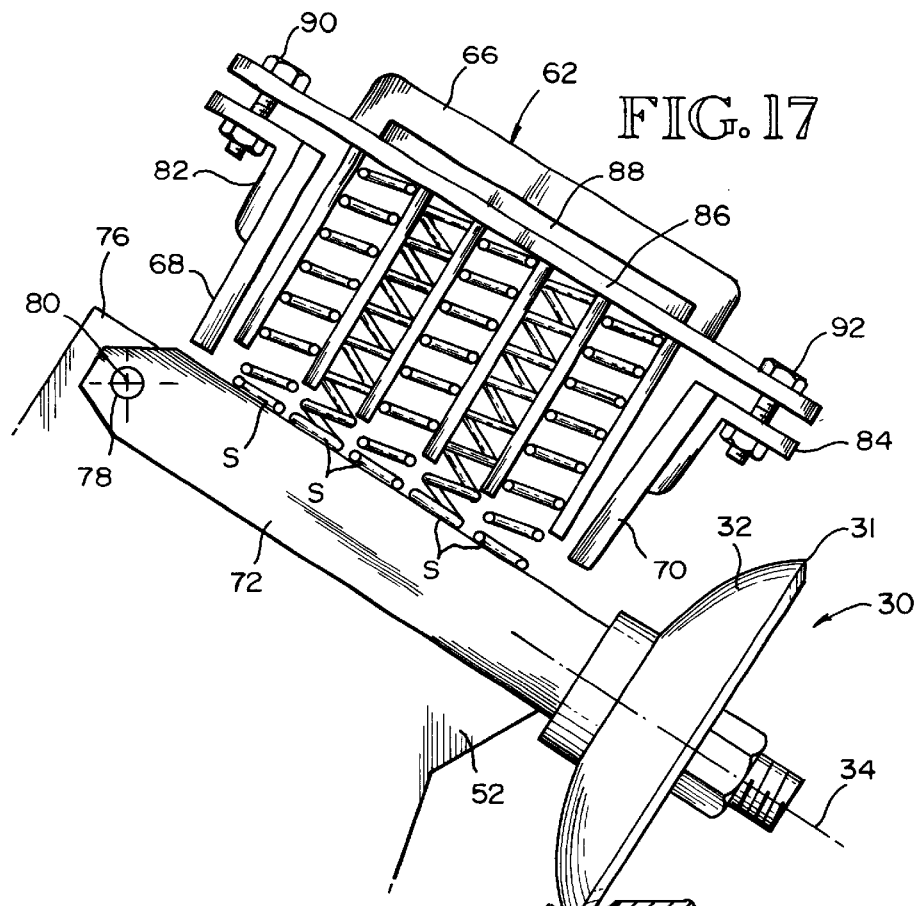
FIG. 17
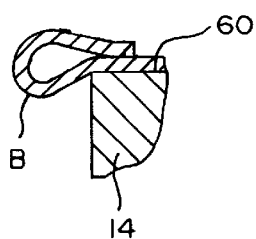
FIG. 18
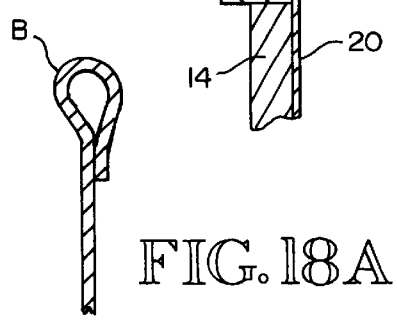
FIG. 18A
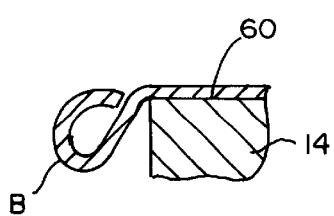
FIG. 19
FIG. 19A

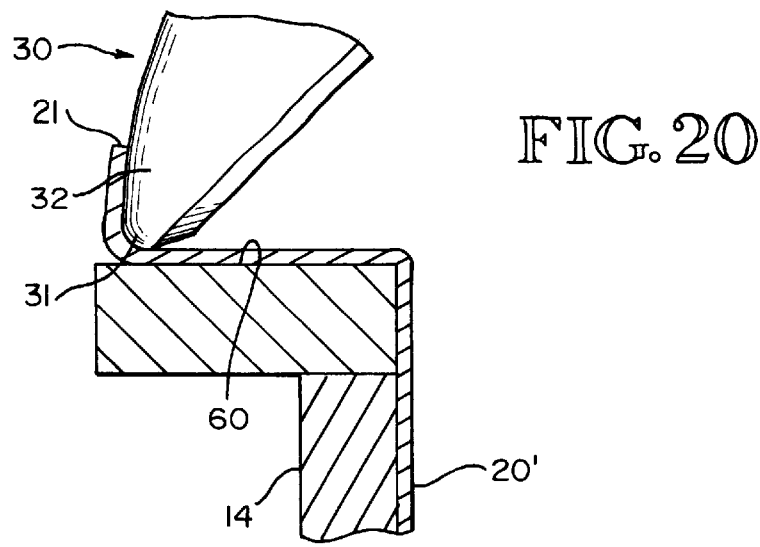
FIG. 20
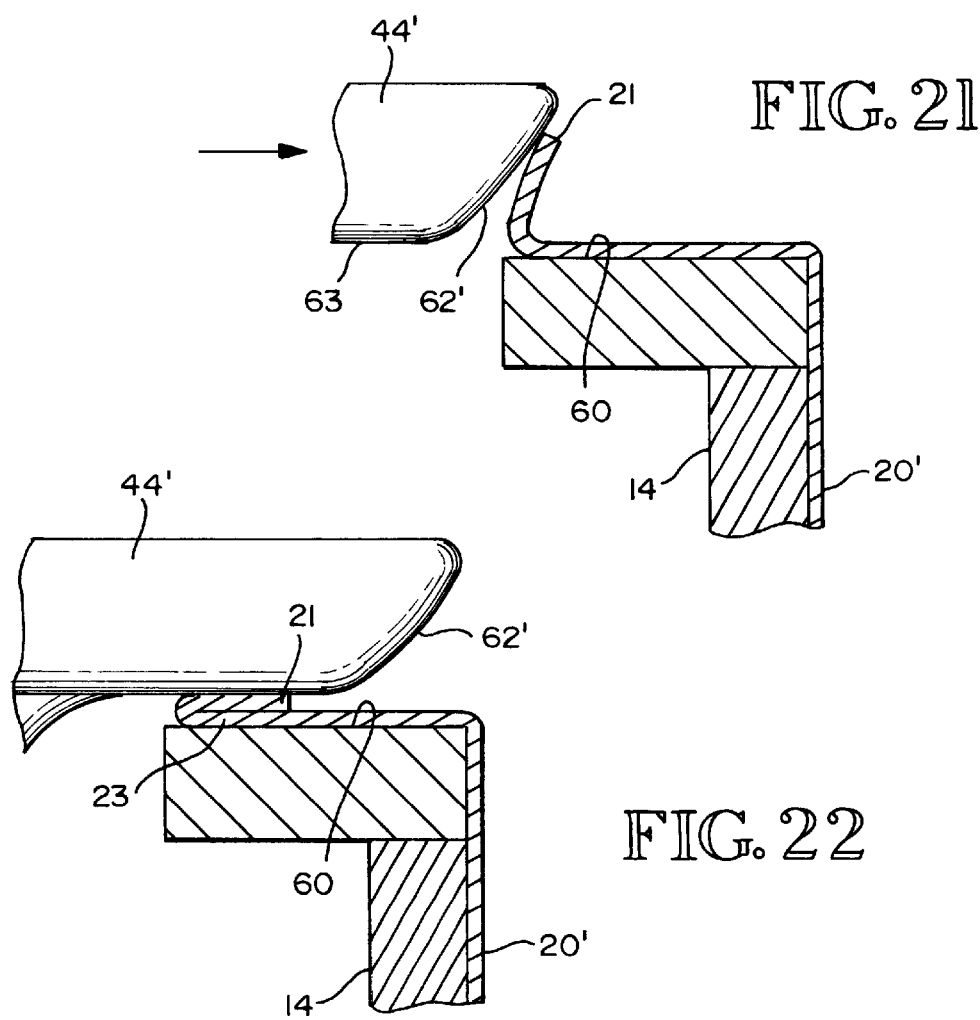
FIG. 21
FIG. 22

SPIN FORMING A TUBULAR WORKPIECE TO FORM A RADIAL FLANGE ON A TUBULAR FLANGE AND A BEAD OR THICK RIM ON THE RADIAL FLANGE

RELATED APPLICATION

This application claims priority to provisional application Serial No. 60/212,399, filed Jun. 19, 2000, and entitled "Spin Forming An End Portion Of A Tube To Form A Radial Flange On A Tubular Flange And A Bead On The Radial Flange."

TECHNICAL FIELD

This invention relates to a method and product aspects of spin forming an end portion of a cylindrical sheet metal workpiece to form a radial flange section and a bead or double-thickness at the periphery of the radial flange section.

BACKGROUND OF THE INVENTION

At least as early as the 1980's Spiral Fittings, Inc., presently located in Andrews, South Carolina, began spin forming cylindrical workpieces to make connector rings for cylindrical HVAC ducting. The Spiral Fittings' connector ring is formed by spin forming a cylindrical workpiece to provide a radial flange at one of its ends. The radial flange becomes what is known as a "mating flange" and the unworked portion of the workpiece becomes what is known as an "insertion flange." This structure is used as a connector ring at one end of a section of HVAC ducting. The insertion flanges of two such connector rings are inserted into end portions of two sections of ducting that are to be connected together. Sheet metal screws or the like are used to connect the end portions of the sections of ducting to the insertion flanges of two connector rings. Then, the two sections of ducting are put into axial alignment with their mating flanges moved almost together. An annular seal is placed between the two mating flanges and nuts and bolts are used to connect the mating flanges together with the sealing ring held between them. A disadvantage of the Spiral Fittings' connector ring is that the mating flanges are relatively flexible and have sharp edges at their outer peripheries.

It is known to provide connector rings for oval ducts with mating flanges having outer peripheries that are in various ways made to be blunt instead of sharp. Example connector member profiles are disclosed by U.S. Pat. No. 5,129,690, granted Jul. 14, 1992 to Manfred Meinig, Peter J. Arnoldt and Fredrick J. Arnoldt. The SMACNA HVAC Duct Construction Standards include several types of standard connector profiles for HVAC ducting. One of these profiles is the T-23 profile which has a double-thick radial flange. Another standard profile is the T-24 profile. It has a cylindrical return hem section at the periphery of the radial flange.

U.S. Pat. No. 5,983,496 granted Nov. 16, 1999 to Jeffrey Allen Hermanson discloses spin forming a cylindrical sheet metal workpiece to make a connector ring for HVAC ducting. Like Spiral Fittings, Inc., Hermanson spin forms a cylindrical workpiece to form a radial flange at one end of the workpiece. The unaltered portion of the workpiece becomes an insertion flange and the radial flange becomes a mating flange. Whereas Spiral Fittings, Inc. leaves a sharp edge at the periphery of its mating flange, Hermanson continues the spin forming operation to form a cylindrical return hem section at the periphery of the mating flange and give the connector ring a standard SMACNA T24 profile. The method of the present invention also continues the spin forming process but uses different action steps and tooling to form either a "bead", or a modified T-23 profile, at the periphery of the mating flange in place of Hermanson's cylindrical, T-24 return hem section.

BRIEF SUMMARY OF THE INVENTION

The invention includes an improved method of spin forming a cylindrical sheet metal workpiece, to form a sheet metal connector ring or sheet metal ducting. A mandrel is used that has an open center, a generally radial forming surface surrounding the open center, and an outer diameter. A first end portion of the workpiece is positioned in the open center of the mandrel and is secured to the mandrel. A second end portion of the workpiece projects axially outwardly from the center opening in the mandrel and has an outer end part. The mandrel and the workpiece are spun together about a common spin axis and the second end portion of the workpiece is progressively stretched in diameter and moved radially outwardly along the generally radial forming surface of the mandrel by a first forming tool. The mandrel and workpiece are rotated and a first forming tool is used to stretch the second end portion of the workpiece and move it radially outwardly on the radial forming surface. This is done at least until the outer end part of the second end portion of the workpiece becomes spaced generally axially from the radial forming surface substantially at the outer diameter of the mandrel. Accordingly to one aspect of the invention, the rotation of the mandrel and workpiece is continued and a second forming tool is moved against the outer end part of the second end portion of the workpiece. This second forming tool is used to curl the outer end part radially inwardly and move it substantially against an adjoining radial part of the second end portion of the workpiece that is in contact with the radial forming surface on the mandrel. Following these forming steps, the formed workpiece is removed from the mandrel to become a connector ring that has a radial flange at a first end and a cylindrical flange at a second end, wherein the radial flange has an outer marginal portion with a rounded outer edge.

Preferably, the second forming tool is used to press the outer end part of the second end portion of the workpiece flat against the adjoining radial part of the second end portion of the workpiece.

The method includes providing a first forming tool that includes a roller having a center axis. The roller is mounted for free rotation about the center axis. The roller is also provided with a convex face. The roller is positioned inside the second end portion of the workpiece, with its convex face directed towards the second end portion of the workpiece. The roller is then moved along a path that is within a plane that includes the spin axis of the mandrel and the center axis of the roller. As it moves, the roller progressively stretches the second end portion of the workpiece and progressively forces it against the generally radial forming surface of the mandrel.

The invention further includes providing a support arm for the first forming tool. The support arm is pivotally connected at a lower end to a support, for pivotal movement about a pivot axis that extends perpendicular to the center axis of the roller. The roller is mounted onto the support arm at a location spaced from the pivot axis. The support arm is swung about the pivot axis to place the roller inside of the second end portion of the workpiece, in position to contact the second end portion of the workpiece and stretch it and force it against the radial forming surface of the mandrel as the roller is being moved.

In preferred form, the mandrel is mounted to rotate about a spin axis that extends substantially vertically. As a result, the generally radial forming surface is in a plane that extends substantially horizontally.

The invention includes mounting the first forming roller for movement towards and away from the generally radial forming surface of the mandrel, and spring biasing the roller towards the radial forming surface. As a result, when the first forming roller is moved to stretch the second end portion of the workpiece and force it against the generally radial forming surface of the mandrel, the first forming roller will be urged by its contact with the workpiece and cause to move upwardly against its bias so as to provide space between its periphery and the radial forming surface of the mandrel for the workpiece material that is being moved radially outwardly in contact with the radial forming surface of the mandrel.

The present invention also includes providing a second forming tool that includes a roller that has a center axis and a cam surface that surrounds the center axis. The second forming tool is moved radially to place its cam surface against the outer part of the second end portion of the workpiece. It is further moved to cause the cam surface to cam the outer part of the second end portion of the workpiece both radially inwardly and axially towards an adjoining radial part of the second end portion of the workpiece that is in contact with the radial forming surface on the mandrel.

According to the present invention, a roller tool and a spin die or mandrel are used to spin form an end portion of a cylindrical workpiece and create a radial flange section that includes an annular groove in metal that is radially outwardly of the spin die. According to an aspect the present invention, the rotary tool is then set into and held in this groove to become a mandrel for the next step of the method. While the roller tool is held in position, a lip-forming tool is moved against the outer periphery of the workpiece. It functions to curl the workpiece upwardly to form a lip outwardly of the groove. Then the roller tool and the lip-forming tool are removed. Next, while the workpiece is still spinning, a lip-curling tool is moved radially inwardly against the lip, to curl the lip inwardly and complete formation of the bead.

The present invention includes providing a connector ring having a cylindrical insertion flange sized to be received within an end portion of a section of sheet metal ducting. It also includes a radial mating flange extending radially outwardly from one end of the insertion flange to an outer edge. The mating flange has an annular, single-thickness, inner portion and an annular, double-thickness, outer portion. The double-thickness outer portion has a laterally rounded outer edge and an inner edge that is spaced radially inwardly from the outer edge on the side of the mating flange that is opposite the insertion flange. The inner edge forms an inner boundary for the double-thickness, outer portion of the mating flange.

The present invention further includes providing a connection between adjoining ends of two duct sections. Two sheet metal connector rings of the type described are provided, one for each duct section. The cylindrical insertion flange of each connector ring is telescopically received in the end portion of its section of sheet metal ducting. The radial mating flanges of the two connector rings confront each other with their double-thickness outer portions substantially touching each other. A space is formed axially between the single thickness inner portions of the two connector rings and radially inwardly of the inner edges of the double-thickness of the outer portion of the mating flanges. A seal ring is situated in the space, contacting the inner portions of the mating flanges. Fasteners (e.g. sheet metal screws) connect the end portions of the duct sections to the insertion flanges of the connector rings. Fasteners (e.g. sheet metal screws) connect the mating flanges of the two connector rings together.

BRIEF DESCRIPTION OF THE SEVERAL VIEWS OF THE DRAWING

Like reference numerals are used to designate like parts throughout the several views of the drawing, and:

FIG. 1 is a side elevational view of forming equipment constructed in accordance with the invention and adapted for making a connector ring that includes a "bead" at the outer periphery of the mating flange;

FIG. 2 is a pictorial view of a strip of sheet metal that is used to form a cylindrical workpiece;

FIG. 3 is a pictorial view of the strip of sheet metal after it has been rolled into a cylindrical shape and its ends have been welded together where they meet, so as to form a cylindrical workpiece;

FIG. 15 is a fragmentary view of the upper portion of FIG. 14, with a foreground cheek plate removed from a housing that is on top of a support arm, such view showing springs inside the housing which press against and bias downwardly a support arm on which a first forming roller is mounted for free rotation about a center axis, FIG. 19 showing the periphery of the forming roller at a level below the level of the radial forming surface on the mandrel, and showing a convex face on the forming roller contacting the inner surface of the second end portion of the workpiece;

FIG. 16 is a view like FIG. 15, but showing the support member and the forming roller moved to the left, and further showing that the forming roller has been moved upwardly against the force of the springs, so that the workpiece metal can lie down on the radial forming surface of the mandrel, between such surface and the periphery of the forming roller;

FIG. 17 is a view like FIGS. 15 and 16, but showing the support and the forming roller moved farther to the left, and showing the forming roller moved past the outer diameter of the radial forming surface, and moved downwardly by the springs, into a groove formed by the peripheral portion of the forming roller in the workpiece at a location radially outwardly of the mandrel;

FIG. 18 is an enlarged scale fragmentary view of the left side portion of FIG. 11, but showing a more rounded bead formed at the outer periphery of the radial flange;

FIG. 18A is a fragmentary view of the upper portion of FIG. 12, but showing the more rounded bead that is shown by FIG. 18;

FIG. 19 is a view like FIG. 18, but showing the bead formed to place the free edge of the bead against the diagonal side of the bead;

FIG. 19A is a view like 18A, but of the bead shown by FIG. 19;

FIG. 20 is a view like FIG. 5, but with the lower portion of the view omitted and with the roller moved further to the left to where the outer end part of the second end portion of the workpiece extends generally axially of the radial forming surface on the mandrel substantially at the outer diameter of the mandrel;

FIG. 21 is a view like FIG. 20, but showing the first forming roller removed and a second forming roller and cam being used to bend the outer part of the second end portion of the workpiece radially inwardly;

FIG. 22 is a view like FIG. 21, but showing the second forming roller and cam moved further to the right so as to flatten the outer end part of the second end portion of the workpiece down onto and against the adjoining radial portion of the flange that is being formed;

DETAILED DESCRIPTION OF THE INVENTION

Figure 4:
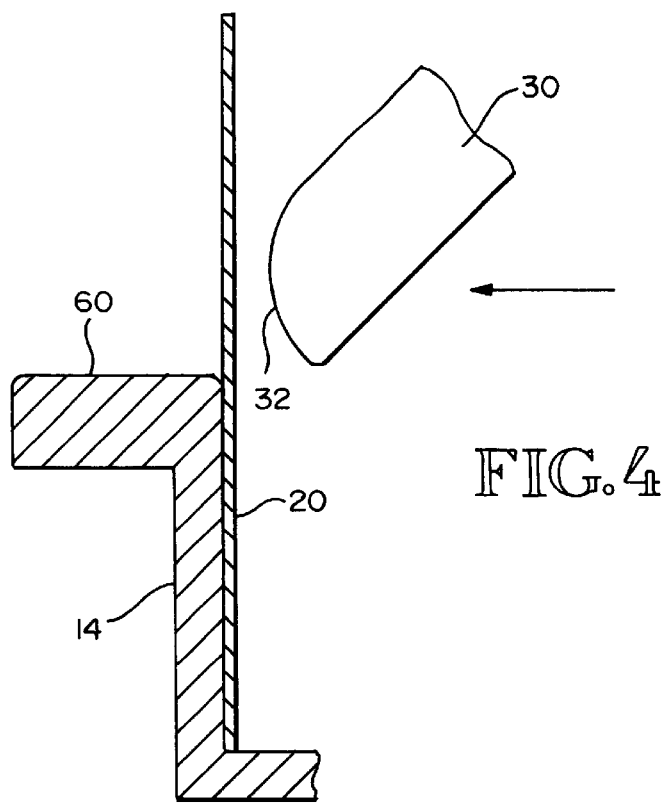
FIG. 4 is a fragmentary sectional view of a portion of the cylindrical workpiece that has been locked to the mandrel shown in FIG. 1, such view also showing a lower portion of a roller tool that is used in the spinning method.

A spindle 10 is suitably mounted for rotation about a vertical axis 12 (FIG. 1). A spin die or mandrel 14 is mounted onto the spindle 10 such that rotation of the spindle 10 will cause a rotation of the mandrel 14 about the vertical axis 12. The mandrel 14 is provided that has a bottom wall and a cylindrical sidewall connected to and projecting upwardly from the periphery of the bottom wall. U.S. Pat. No. 4,117,704, granted Oct. 3, 1978, to Robert Nakache, and British Patent Specification No. 871,733, published Jun. 28, 1961, both show a spin die or mandrel that is rotatable about a vertical axis.

A sheet metal sheet is cut into narrow rectangular strips 16 (FIG. 2). The strips 16 are each rolled into a cylindrical shape. The abutting ends of each rolled strip are welded together at 18 to form a continuous, cylindrical sheet metal ring 20 (FIG. 3). This method of forming a cylindrical workpiece is per se old. It is a well-established practice. Also, it is disclosed in the aforementioned U.S. Pat. No. 5,983,496 and British Specification 871,733. It is also disclosed in U.S. Pat. No. 3,738,689, granted Jun. 12, 1973 to J. S. Forni.

A lower end portion of a sheet metal ring 20 is set down into the mandrel 14 and is secured to the mandrel 14 in any suitable manner. When the sheet metal ring 20 is secured to the mandrel 14, an upper end portion of the ring 20 projects upwardly above the mandrel 14 (FIG. 4). A table 22 extends laterally from the mandrel 14 (FIG. 1). A track is formed in the table 22 and extends outwardly from the mandrel 14. A tool support 24 is mounted on the table 22 and is guided by the track for movement towards and away from the mandrel 14. The tool support 24 includes lead screw nuts 26 that are within the track, each includes a threaded lead screw opening. A lead screw 28 in the track extends through the threaded openings. It has an axis coinciding with the axis of the track and the lead screw opening. Rotation of the lead screw 28 in one direction moves the tool support 24 towards the mandrel 14. Rotation of the lead screw 26 in the opposite direction moves the tool support 24 away from the mandrel 14.

A roller tool 30 is mounted on the tool support 24 and is swingable between a raised position and a lowered position. When it is in its raised position (FIG. 1), roller tool 30 is above the sheet metal ring 16 (FIG. 1). When it is in its down position, it is inside of the sheet metal ring 16 and its periphery 32 is radially inside of the sheet metal ring 16 (FIG. 4). The roller tool 30 is also mounted on the tool support 24 for free or passive rotation about its axis 34.

Figure 5:
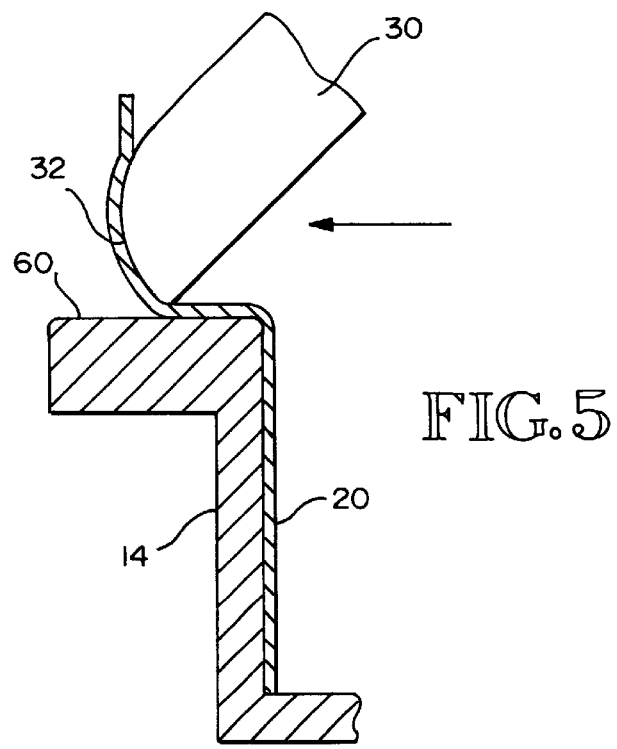
FIG. 5 is a view like FIG. 4, but showing the roller tool being moved against the projecting portion of the cylindrical workpiece, and in the process of stretching it both radially and circumferentially.
Figure 6:
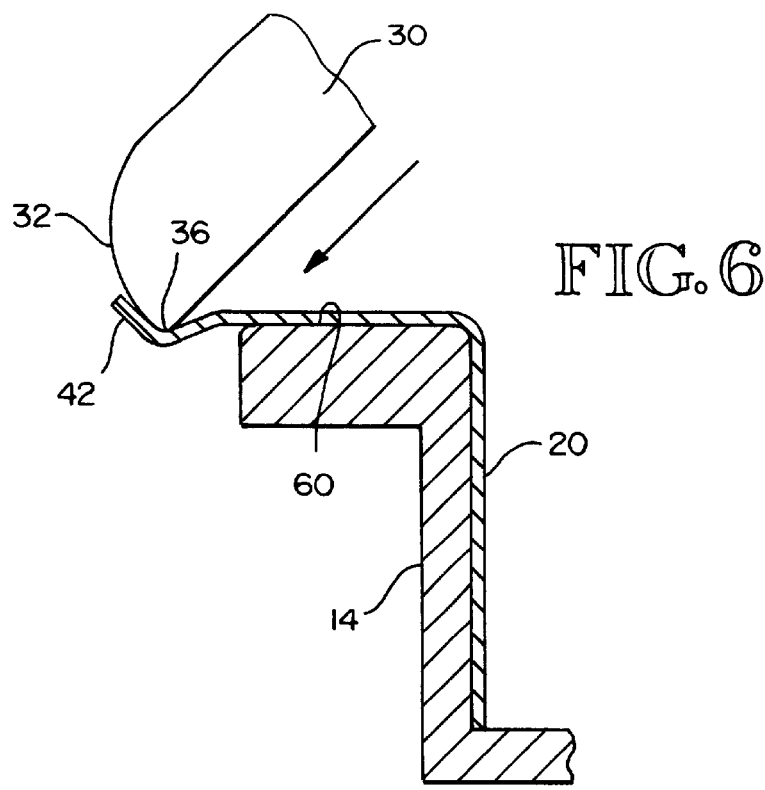
FIG. 6 is a view like FIG. 5, showing the position of the roller tool relative to the sheet metal after an intermediate section of the sheet metal has been forced by the roller tool into contact with a radial surface on the spin die.

A motor M is provided to rotate the spindle 10, the mandrel 14 and the sheet metal ring 20. The tool support 24 and the roller tool 30 are moved to position the roller tool 30 inside the sheet metal ring 20, with its periphery 32 inwardly of the upper end portion of the sheet metal ring 20 (FIG. 4). The lead screw 28 is rotated to cause movement of the tool support 24 radially inwardly and radially outwardly. Radial outward movement moves the periphery 32 of the roller tool 30 towards the upper end portion of the sheet metal ring 20. Lead screw rotation is continued in the same direction. This moves the periphery 32 of the roller tool 30 against the sheet metal ring 20, above the mandrel 14, and causes the sheet metal ring 20 to stretch outwardly (FIG. 5). Movement of the roller tool 30 continues until a portion of the sheet metal ring 20 that is above the mandrel 14 is moved first outwardly and then downwardly to form a generally radial flange F (FIG. 6). When this happens, a flange extension is also formed radially outwardly of the flange F. The flange extension is formed to include an upwardly opening annular groove 36.

Figure 7:
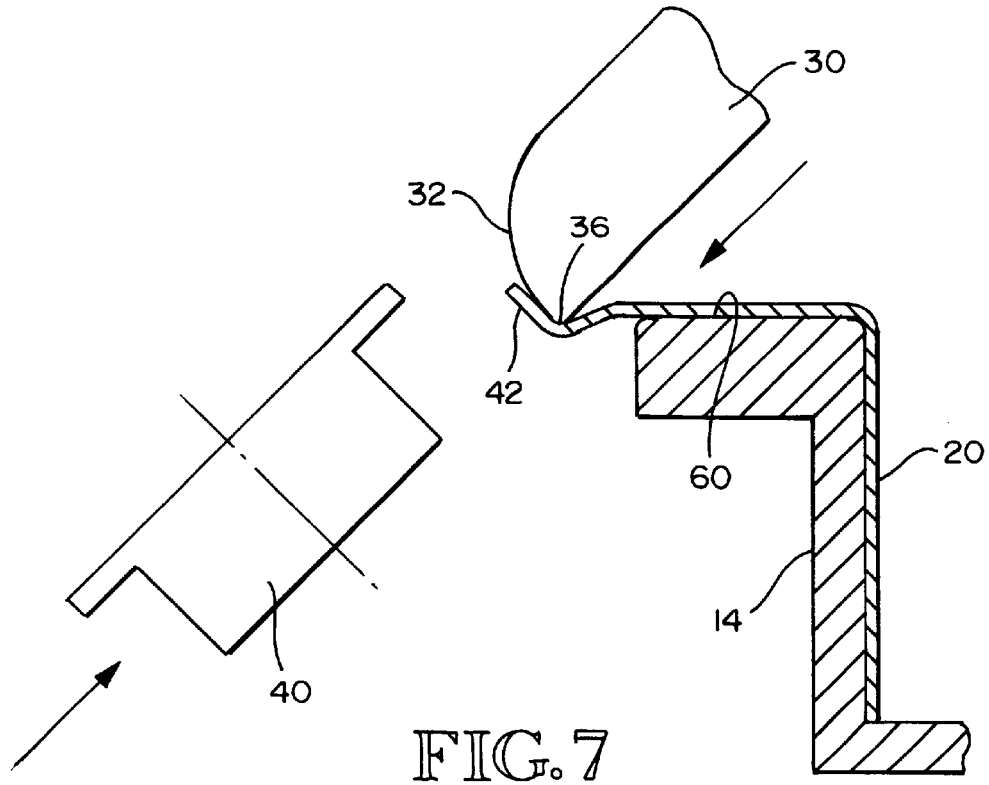
FIG. 7 is a view like FIG. 6, but showing the periphery of the roller tool positioned within a groove that is formed in the sheet metal outwardly of the radial flange, and further showing a lip forming and groove shaping tool in the process of being moved upwardly towards an outer lip portion of the sheet metal.
Figure 8:
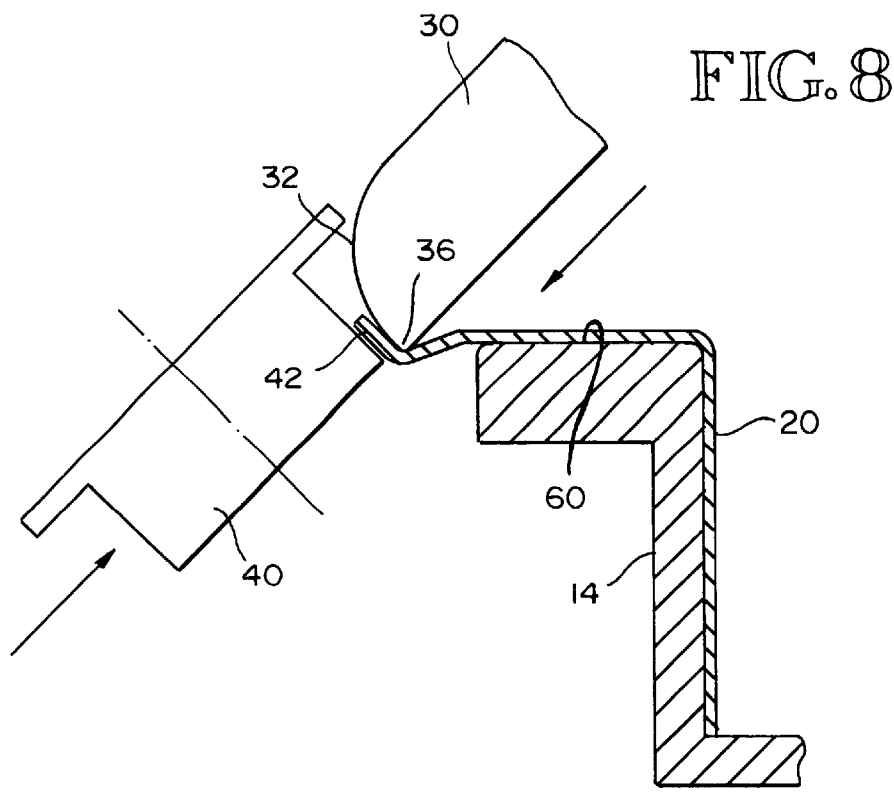
FIG. 8 is a view like FIG. 7, but showing the lip forming and groove shaping tool being moved to force the lip upwardly and against a peripheral portion of the roller tool while the roller tool is being held in the groove.

The tool support 24 is moved to place the roller tool 30 above the groove 36. The roller tool 30 is then lowered into the groove 36 (FIGS. 6 and 7). A lip-forming tool 40 (FIGS. 7 and 8) is carried to the tool support 24 and is supported on the tool support 24. Tool 40 is supported from the tool support 24 to a position below the sheet metal ring 20, radially outwardly of the groove 36. While the mandrel 14 and ring 20 are still rotating, the roller tool 30 is moved downwardly into the groove 36. The tool 40 is moved upwardly against the outer perimeter portion 42 of the ring 20 (FIG. 8). This moves the groove 36 against the roller tool edge 32 to further shape and even up the groove 36. The mandrel 14 is power rotated. The tools 30, 40 are passively rotated by their contact with the workpiece at 42.

Figure 9:
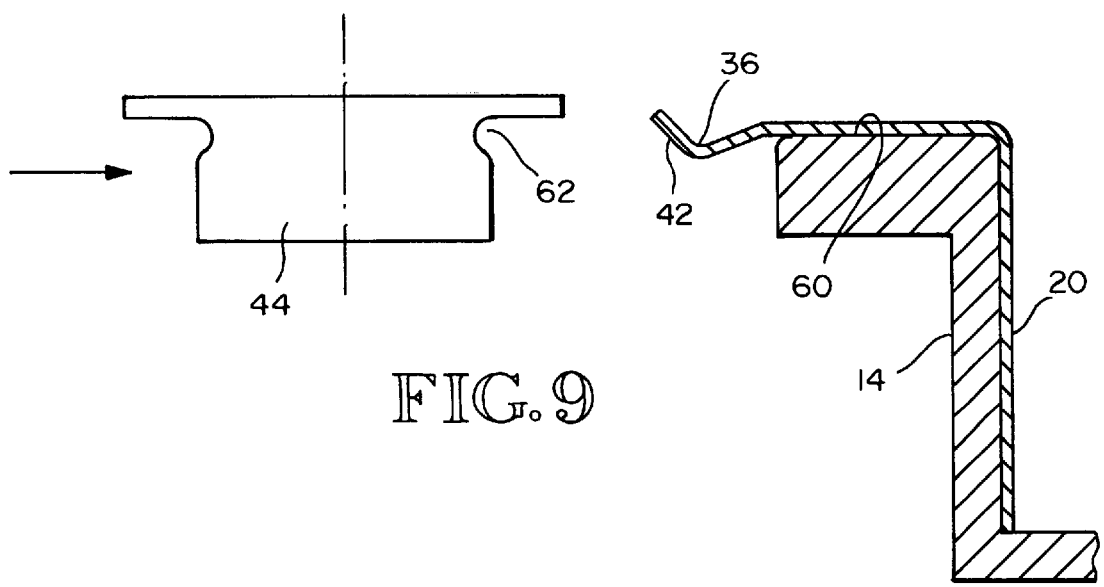
FIG. 9 is a view like FIG. 8, but with both the roller tool and the lip forming and groove shaping tool removed, and showing a curling roller in the process of being moved radially inwardly towards the outer lip.
Figure 10:
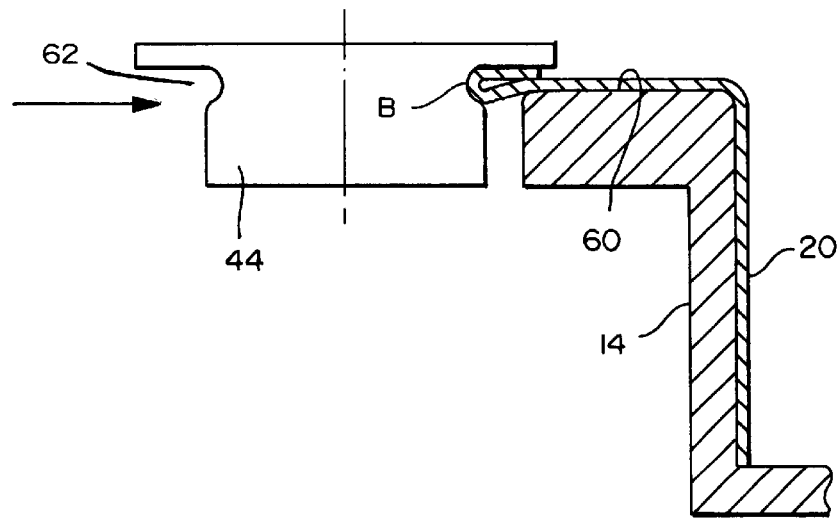
FIG. 10 is a view like FIG. 9, but showing the curling roller moved into contact with the lip and being used to curl the lip for completing formation of a bead at the periphery of the radial flange that includes the groove and the lip.
Figure 11:
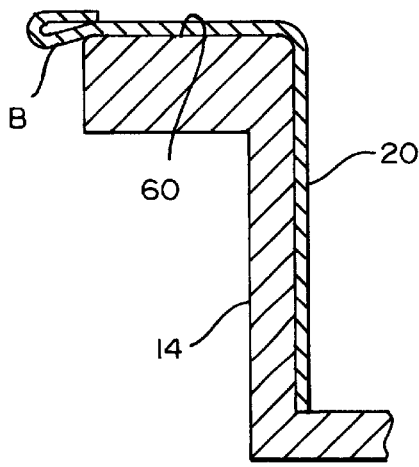
FIG. 11 is a view like FIG. 10, but showing the bead curling roller removed.

Next, the tool 40 is moved away from the lip 42 and the roller tool 30 is moved out of and away from the groove 36. A third tool 44 is provided on the tool support 24 (FIGS. 9 and 10). Tool 44 is moved radially inwardly against the lip 42 in such a way that the lip 42 of the ring 16 is curled back towards the radial flange F to form a bead B at the perimeter of the radial flange RF. The die or mandrel 14 is power rotated. Tool 44 rotates passively by its contact with the lip 42.

Referring back to FIG. 1, the tool support 24 includes a base 50. The lead screw nuts 26 depend from the base 50 into the track which may be a slot in the table 22. A post 52 projects upwardly from the base 50. The lower end of post 52 is connected to the base 50 for pivotal movement about a horizontal axis 54. An adjustable length strut 56 is interconnected between an upper portion of the post 52 and a rearward portion of the base 50. Extension of the strut 56 swings the post 52 forwardly and downwardly and moves the roller tool 30 downwardly. Retraction of the strut 56 swings the post 52 rearwardly and upwardly and moves the roller tool 30 upwardly. Adjustable strut 56 may be a double acting hydraulic cylinder.

Referring to FIG. 5, when the radial flange section is being formed, the roller tool 30 is forced downwardly against the sheet metal by an extension of the strut 56. At the same time, the lead screw 28 is operated to move the carriage 50 rearwardly. This draws the roller tool 30 against the sheet metal, causing it to stretch radially and circumferentially and eventually assume the shape shown in FIG. 7. Contact of the periphery 32 of the roller tool 30 with the sheet metal, backed up by the radial surface 60 of the mandrel 14, causes the roller tool 30 to stay above the surface 60 and in contact with the sheet metal until the roller tool 30 is moved radially outwardly beyond the mandrel 14. When the roller tool 30 clears the edge of the mandrel 14, stored spring energy (e.g. in the strut 56) forces the roller tool 30 downwardly into annular groove 36 in the region of the sheet metal that is radially outwardly of the forming surface 60.

Respecting the process described above, the remainder of the manufacturing process occurs in the region radially outwardly of the mandrel 14. As described above, the roller tool 30 now becomes a spin die or mandrel when the tool 40 is moved against the lip 42. Then, when bead forming tool 44 is used (FIGS. 9 and 10), an annular groove 62 in the bead forming tool 44 provides all of the forming surfaces that are needed to curl the lip 42 into a finish bead B.

Figure 12:
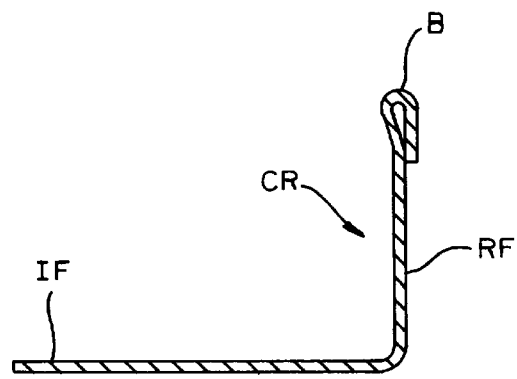
FIG. 12 is a view like FIG. 11, but showing the connector ring removed from the mandrel.

FIG. 12 shows the profile of the connector ring CR formed by the above-described method. The radial mating flange RF extends radially outwardly from the cylindrical insertion flange IF. The bead B is at the outer periphery of the radial flange RF.

In use, the insertion flange IF is inserted into an end portion of a first section of HVAC ducting. The insertion flange IF of a second connector ring CR is inserted into an end portion of a second section of the HVAC ducting. Then, the two radial flanges RF are brought together, and an annular seal is placed between them, as disclosed by FIGS. 15 and 16 of the aforementioned U.S. Pat. No. 5,129,690. Then, a ring of nut and bolt assemblies are used to connect the two radial flanges RF together, with the seal member between them, as also disclosed by U.S. Pat. No. 5,129,690. The bead B replaces the sharp edge at the outer periphery of the radial flange RF with a smooth, rounded edge. It also adds stiffness to the flange RF.

Figure 14:
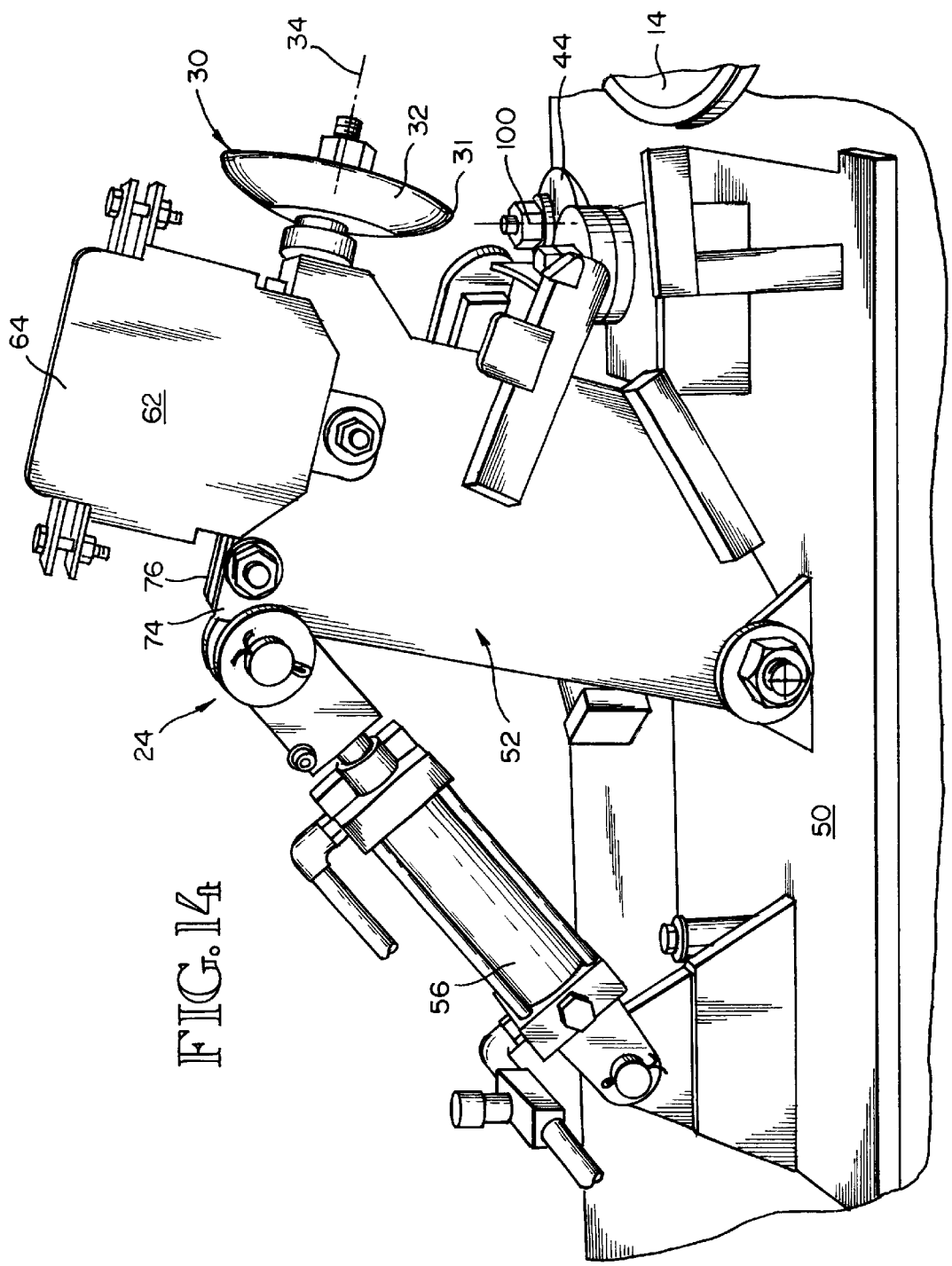
FIG. 14 is an enlarged scale side view of a central portion of FIG. 1, showing more detail than is shown in FIG. 1.

As best shown by FIGS. 14–17, the upper portion of post 52 includes a spring housing 62 formed by a pair of side plates 64, 66 and end plates 68, 70. An elongated mounting bar 72 is located between two lower side plates 74, 76 (FIG. 14). A bolt or some other suitable pivot pin 78 mounts one end of support bar 72 for pivotal movement about a transverse axis 80. Sections of angle iron 82, 84 are secured to the end plates 68, 70. Specifically, generally vertical legs of the angle irons 82, 84 are connected to the end plates 68, 70 and generally horizontal legs project laterally outwardly from the end plates 68, 70. A top plate 86, stiffened by a longitudinal bar 88 on its topside, provides a removal top for the housing 62. A plurality of springs S are positioned within the housing 62. The lower ends of the springs S rest on the mounting bar 72. The upper ends of the springs S contact the top plate 86. Nut and bolt assemblies 90, 92 serve to adjustably secure the top plate 86 to the angle iron members 82, 84. The springs S are placed within the housing 62, with their lower ends touching the mounting bar 72. Then the top plate 86 is installed and the bolts 90, 92 are tightened to the extent necessary to apply a downwardly biasing force on the mounting bar 72. Roller 30 is mounted on the mounting bar 52 for free rotation about a center axis.

As shown in FIG. 15, the roller 30 has a start position in which its periphery 31 is at a level below the level of forming surface 60. In order for the assembly shown in FIG.

15 to move from its FIG. 15 position over to its FIG. 16 position, the roller 30 must ride up on the sheet metal workpiece 20 so that the upwardly projecting end portion of the workpiece 20 will bend over on to surface 60 and be movable by the periphery 31 of roller 30 outwardly on the surface 60 in response to the outward movement of roller 30.

Starting with FIG. 15, with the periphery 31 of the roller 30 at a level below the level of forming surface 90, the lead screw 28 is operated to move the frame 50 and the various elements 52, 30 mounted on it to the left as illustrated in FIG. 1. The corner formed between the inner surface of the workpiece 14 and the forming surface 60 becomes a speed bump over which the roller 30 must travel. The convex surface 32 on the roller 30 functions to stretch the projecting end portion of the workpiece 20 and start it moving up and over onto the surface 60. As the roller 30 moves to the left, as pictured, it rises up onto the workpiece as the workpiece is moving up onto the surface 60. At the same time, the mounting arm 72 for the roller 30 swings upwardly against the force of the springs S, storing energy in the springs S.

FIGS. 15, 16, 5, 20 and 6 show the progression of movement of the roller 30 against the projecting portion of the workpiece 20, and the projecting portion of the workpiece 20 against the surface 60, throughout the radial travel of the roller 30 from its start position (FIG. 15) out to an end position in which roller 30 is positioned radially outwardly of the outer diameter of the surface 60 (FIG. 6). As the periphery 31 of the roller 30 moves past the outer diameter of the forming surface 16, the stored energy in the springs S functions to press the mounting bar 72 and the roller 30 downwardly. At the same time, the roller 30 continues its radially outward movement relative to the forming surface 70. The stored energy in springs S forces the periphery 31 into the sheet metal, forming the above-described groove 36.

The springs S are herein shown in the form of coil springs. The number, size, placement and stiffness of the springs may vary. Also, gas springs (or spring) may be used in place of the coil springs S. Also, a solid block elastomeric spring (or springs) may be used. All that is necessary is a member that will compress and store energy when compressed.

In the illustrated embodiment, the bolts 90, 92 serve as a way of adjusting the stored energy in and initial position of the springs S, in addition to securing the cover plate 86 to the mounting brackets 82, 84. Slight adjustments can be made in the above-described equipment and procedures for making slight changes in the shape of the edging on the radial flange. FIGS. 11, 12, 18, 18A, 19, and 19A show various configurations of the bead B.

According to another aspect of the invention, a shorter workpiece 20' (FIGS. 20–22) may be used. Then, the roller 30 can be moved radially outwardly until its periphery 31 is substantially in the position shown by FIG. 21. In this position, the outer end part 21 of the projecting portion of the workpiece 20' is substantially at the outer diameter of the forming surface 60. It is also still against the convex surface 32 and thus it projects generally axially outwardly from the surface 60. Herein the language substantially at the outer diameter of the mandrel 14 means in a position wherein the periphery 31 of the roller 30 is on one side or the other of the outer diameter with the end part 21 of the workpiece 20' still positioned against the convex surface 32. After this position is reached, the forming roller 30 is removed from contact with the workpiece and back out of the way. Then, the second roller 44' is moved radially against the outer end part 21 of the workpiece 20', while the mandrel 14 and workpiece 20' are still spinning. Forming roller 44' is moved radially inwardly so as to cause its cam surface 62' to curl the end part 21 of workpiece 20' radially inwardly and then move it down substantially flat against the adjoining radial portion 23 of the workpiece 20' that is against and has assumed the shape of the surface 60, as shown by FIG. 22.

Figure 23:
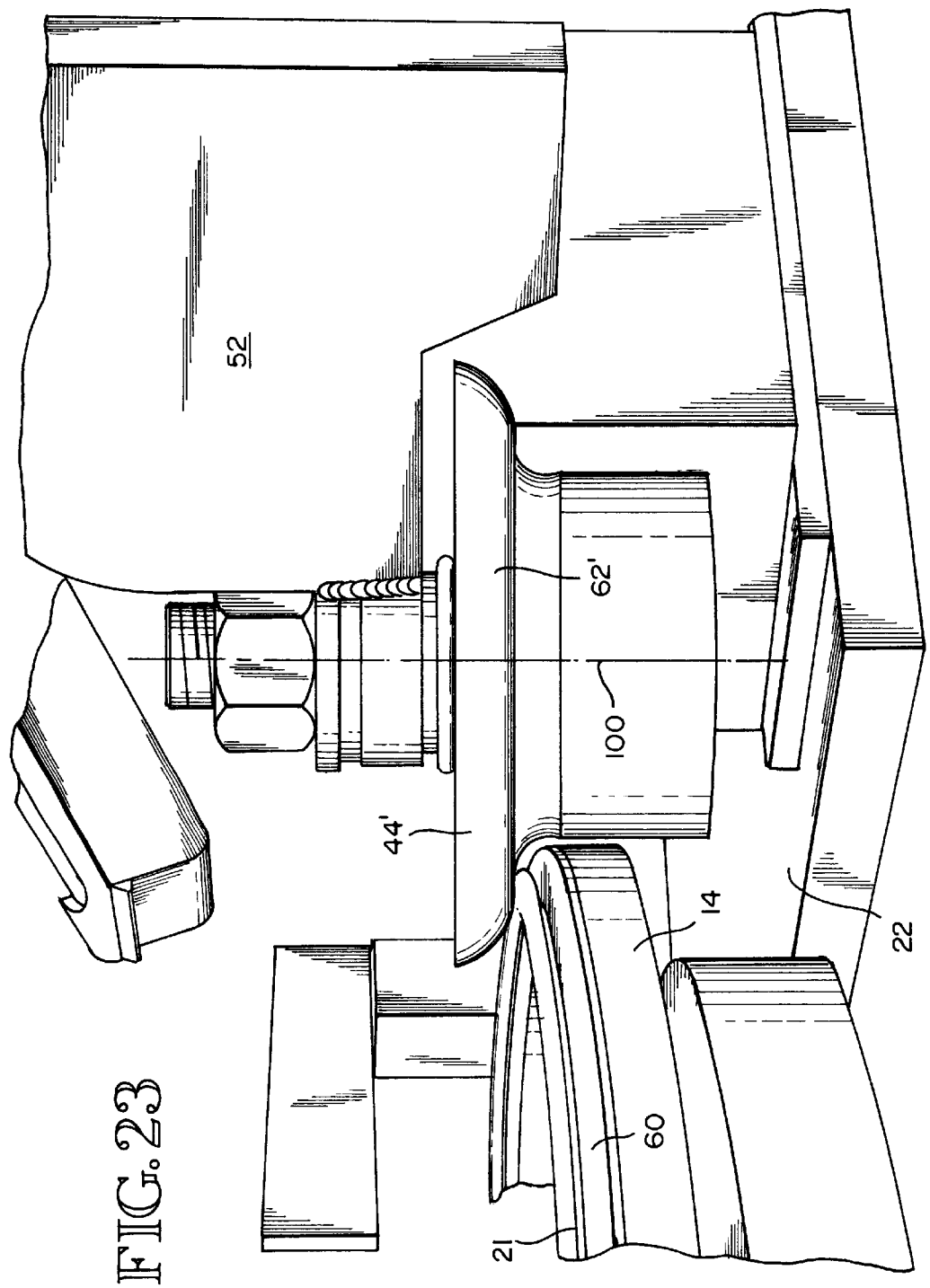
FIG. 23 is a fragmentary pictorial view showing the second roller tool and cam forming the function depicted in FIG. 22.
Figure 24:
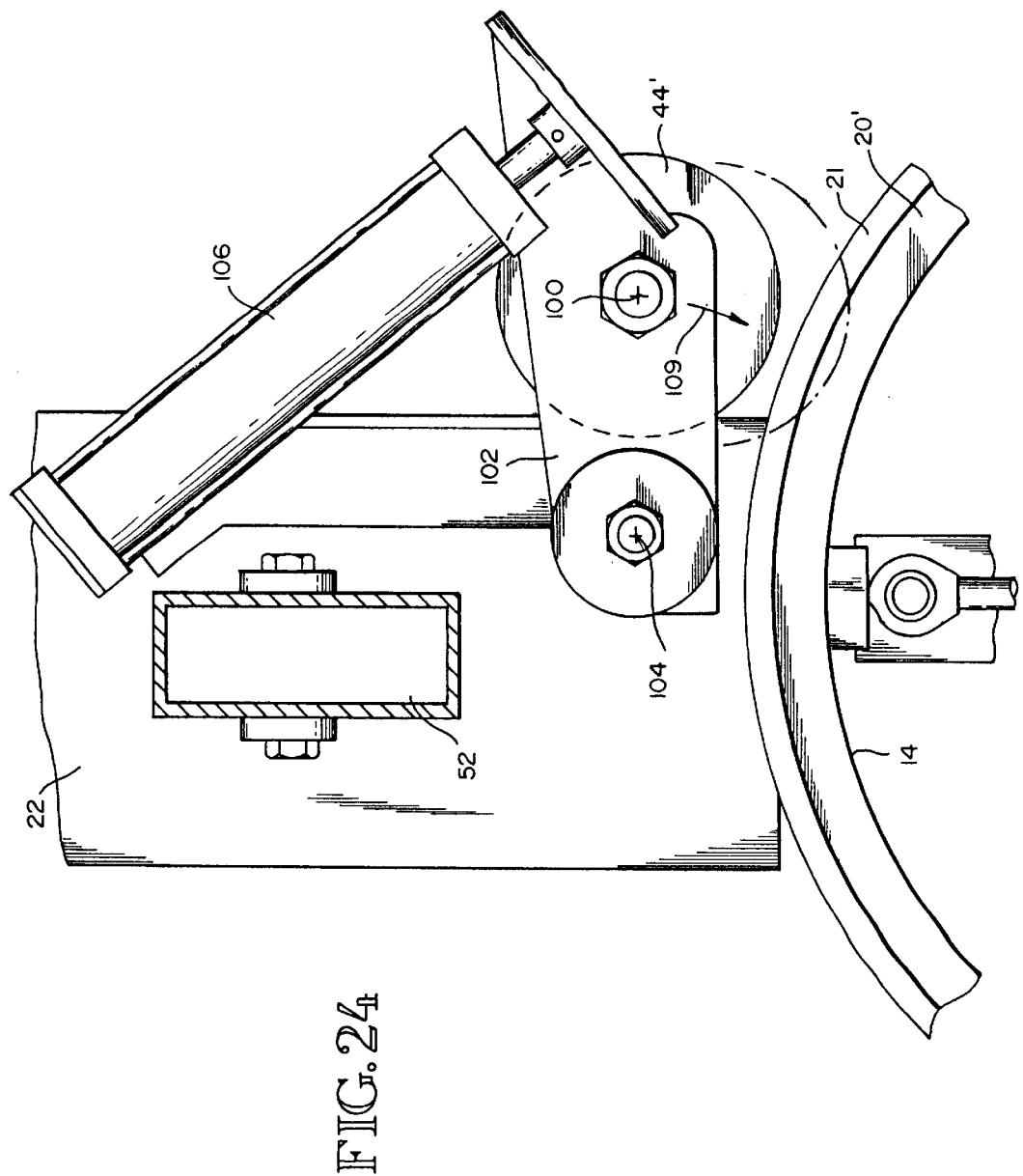
FIG. 24 is a fragmentary top plan view, looking down on the second forming roller and cam and the assembly of which it is apart, such view including a solid line drawing of the forming roller and cam retracted from the mandrel and workpiece and a broken line showing of the forming roller and cam positioned in the position shown by FIGS. 22 and 23.

Referring to FIGS. 23 and 24, the roller 44' is mounted for free rotation about an axis 100. By way of example, it may be mounted on to a swing arm 102. The swing arm 102 is then mounted for rotation about a swing axis 104 (FIG. 24). Swing arm 102 is mounted onto a frame 50 (FIG. 14). A linear actuator 106 may be connected to an outer end portion of the arm 102. FIG. 24 shows the actuator 106 retracted and the arm 102 and forming roller 44' moved back away from the mandrel 14 and the workpiece 20'. FIG. 24 also includes a broken line showing of the position of forming roller 44' when the actuator 106 is extended. Extension of the actuator 106 swings the arm 102 in the direction of arrow 104, moving with it the roller 44'.

Figure 25:
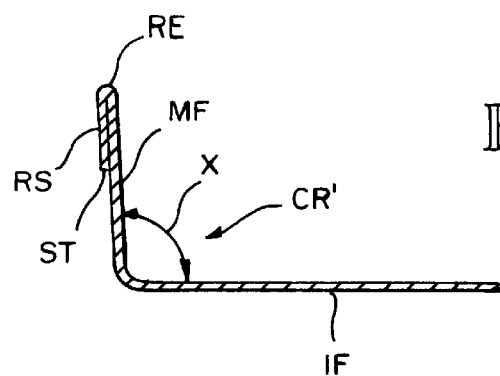
FIG. 25 is a view like FIG. 12, but showing a double-thick flat edge at the outer periphery of the mating flange.

FIG. 25 shows the connector ring CR' that is formed by the just described method. This connector ring has a tubular insertion flange IF and a radial mating flange MF. This mating flange MF includes a rim strip RS that extends radially substantially against the radial body of mating flange MF. It also includes a rounded edge RE. The rim strip RS provides the mating flange MF with an annular double-thickness portion at its outer periphery, and with a rounded outer edge RE. It also provides an inner edge SS on strip RS that functions as a seal stop SI.

Figure 26:
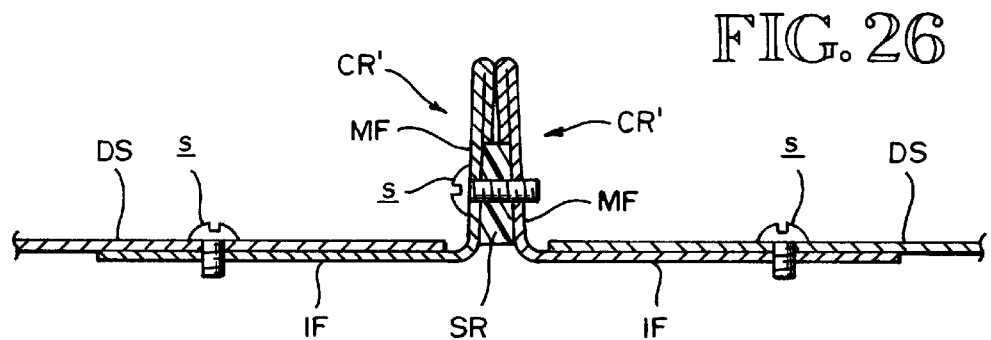
FIG. 26 is a fragmentary sectional view of a joint formed by two connector rings that are connected together by sheet metal screws or bolts extending through the two mating flanges.

FIG. 26 shows a connection formed by two connector rings CR' between which has been inserted a seal ring SR. Seal ring SR may be formed in situ by applying an annular bead of a sealing material against the surface of the mating flange MF immediately inwardly of the edge ST. Or, the seal ring SR may be a preformed ring or may be made of strip material that is set in place against the surface of the mating flange MF radially inwardly of the edge ST.

As shown by FIG. 26, when the two connector rings CR' are brought together, the rim strips RS contact, providing a space inwardly of the two edges ST in which the seal ring SR may be received. The insertion flanges IF of the connector rings CR' are inserted into the tubular end portions of the duct sections DS and sheet metal screws S are used to connect the duct sections DS to the insertion flanges IF. Also, sheet metal screws S are used to connect the two mounting flanges MF together. As these sheet metal screws S are fastened, they draw together the portions of the mating flanges MF that are inwardly of the contacting rim strips RS. There may be some movement of the sheet metal, causing some stressing of the threads of the sheet metal screws S. This functions to help stiffen the connector rings CR' and the joint that they form.

Figure 27:
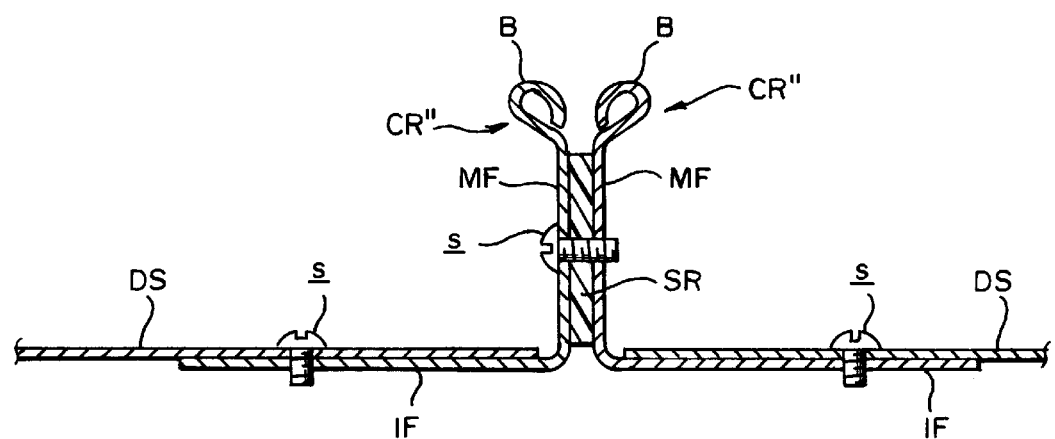
FIG. 27 is a view like FIG. 26, but showing a joint formed by the use of connector flanges having the profile shown by FIG. 19A.
Figure 28:
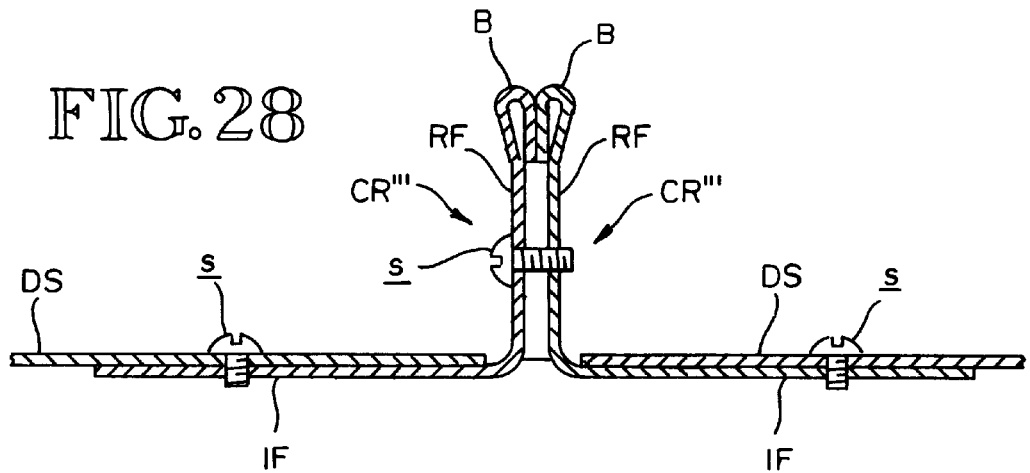
FIG. 28 is a view like FIGS. 26 and 27 showing a joint formed by connector rings having the profile shown by FIG. 12.

FIG. 27 shows a joint formed by two connector rings CR". These rings include beads-B of the type shown by FIGS. 19 and 19A. FIG. 28 shows a joint formed by two connector rings CR'" that include a bead B of the type shown by FIG. 12. This joint includes beads B but it also functions like the joint shown by FIG. 26.

Referring to FIG. 25, the angle between mating flange MF and insertion flange IF may be substantially about ninety degrees or may be a little more than ninety degrees (about 91–93 degrees) so that the mating flanges MF will lean towards each other somewhat at the joint. This builds some spring energy in the mating flanges MF. When the mating flange screws S are tightened, they will tend to move the mating flanges MF into perpendicular positions with the insertion flanges. Any movement of the mating flanges MF will serve to strengthen the joint, together with the contact between the rim strips SR and the double-thicknesses of the rim strips. The connector ring embodiment shown by FIG. 25 is a preferred embodiment because it combines together a stiffening of the mating flanges MF, the provision of a rounded edge RE in the exposed region, a complete hiding of the sharp edge ST and a construction that provides a guide for installing the seal material SR.

Figure 13:
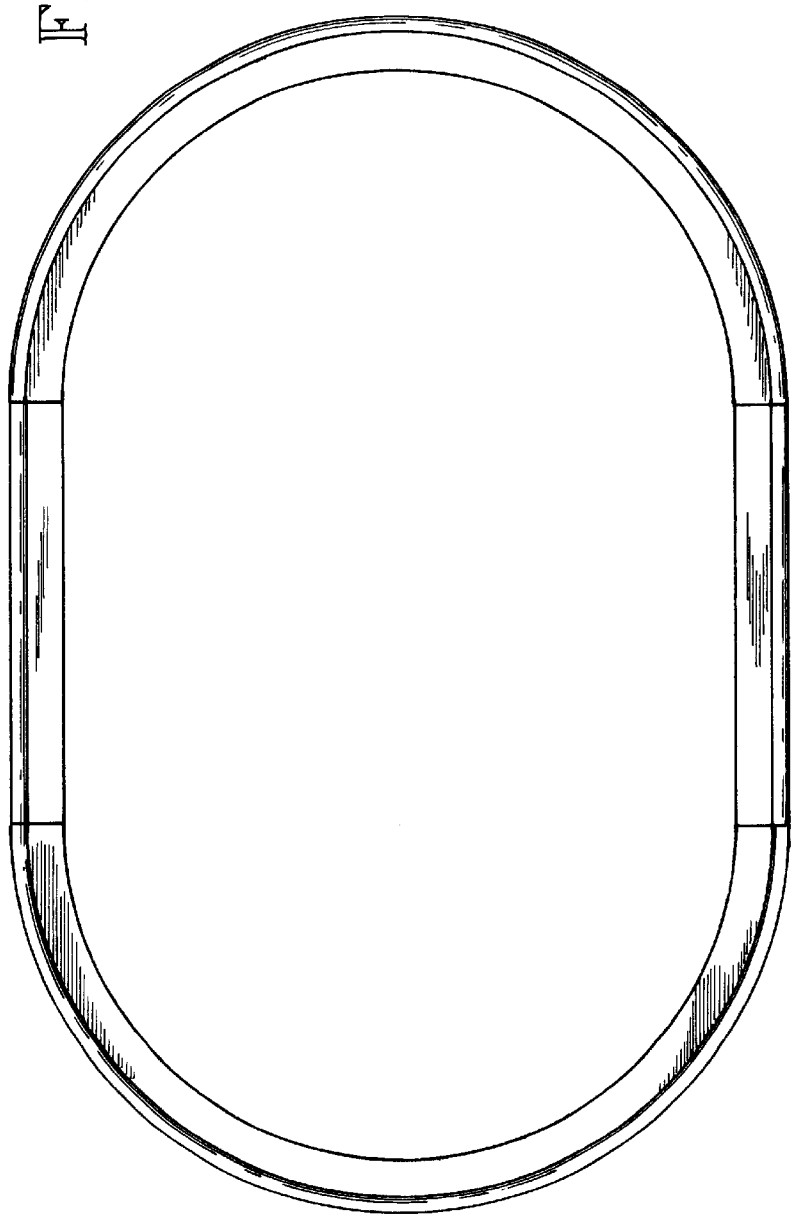
FIG. 13 is an elevational view looking towards an oblong connector ring that is constructed in accordance with the present invention, such view looking towards the side of the ring that is opposite the axial insertion flange.
Figure 13A:
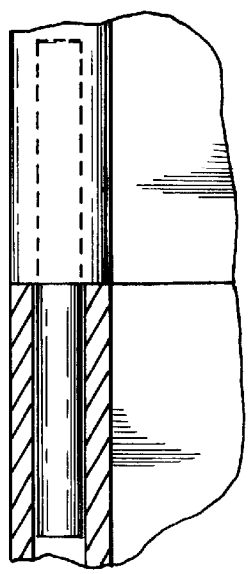
FIG. 13A is an enlarged scale fragmentary view looking towards one of the joints shown in FIG. 12, with a foreground portion of a bead cut away so as to show a splicing rod or dowel inside of the end portions of the beads that come together at the joint.

The various connector rings can either be circular or oblong. FIG. 13 shows an oblong connector ring made from a single circular connector ring cut in half to form curved portions of the ring. Straight sections are interconnected between confronting ends of the curved sections. The straight sections are roll formed to include either a bead or a double-thickness rim portion that matches the profile of the curved section. FIG. 13A shows that when a beaded edge is used, dowels may be used for positioning the ends to be joined before they are welded. The dowel may be a metal rod. Its presence substantially aligns the ends of the sections. Then, these ends are welded on one or both sides of the ring.

Figure 29:
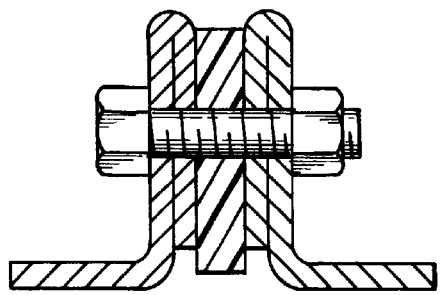
FIG. 29 shows a first form of a SMACNA T-23 connector profile.
Figure 30:
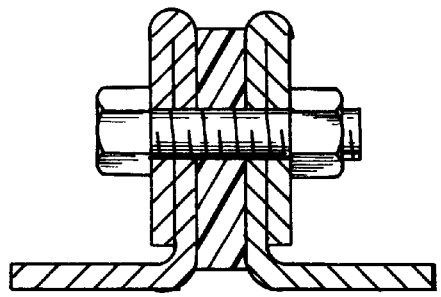
FIG. 30 is a view like FIG. 29, but showing a second form of the T-23 profile.

FIGS. 29 and 30 show two different forms of a SMACNA T-23 connector profile. FIG. 29 shows the folded portion of the mating flange directed towards and contacting the seal ring. FIG. 30 shows the mating flanges folded outwardly rather than inwardly.

Figure 31:
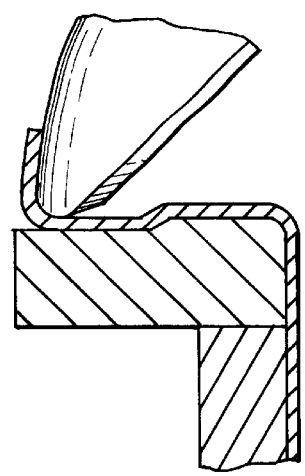
FIG. 31 is a view like FIG. 20, but showing an offset formed in the radial forming surface of the mandrel.
Figure 32:
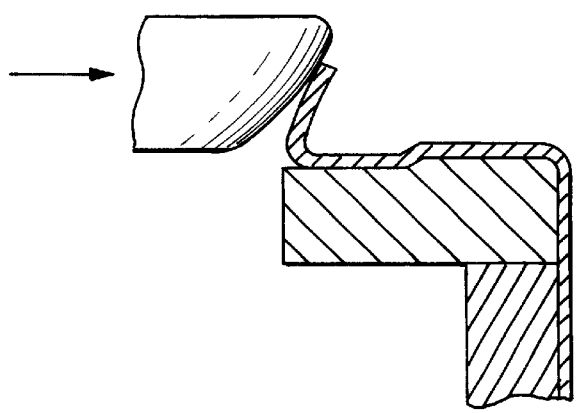
FIG. 32 is a view like FIG. 21, but showing the mandrel construction of FIG. 31.
Figure 33:
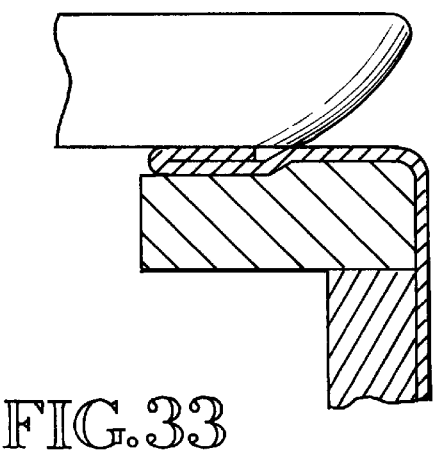
FIG. 33 is a view like FIG. 22, but showing the mandrel construction of FIGS. 31 and 32.
Figure 34:
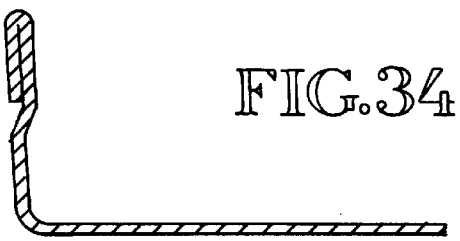
FIG. 34 is a view like FIG. 25, but showing the double-thickness region of the mating flange offset towards the insertion flange side of the connector ring.

FIGS. 31–34 show a modified form of the invention. In FIGS. 31–33, the mandrel 14' is shown to have an offset forming surface 60'. The forming roller 30 presses the workpiece against the offset forming surface 60' such that an offset is formed in the portion of the workpiece that is pushed against the forming surface 60'. FIGS. 32 and 33 show that when the forming tool 44' is moved against the end part 21 of the outer portion of the workpiece 20', the camming surface 62' will fold the end portion 21 down onto the adjoining portion of the workpiece which is the portion that has been offset. When the end part 21 is down flat against part 23', the double-thickness portion of the mating flange is offset on the insertion flange portion of the connector ring. The outer surface of part 21 is substantially flush with the outer surface of the single thickness inner portion of the mating flange.

Forming the offset in the mating flange will further reinforce the mating flange and hence the connector ring as a whole. An advantage of having the double-thickness portion of the mating flange offset from the side of the mating flange opposite the insertion flange is that there will in most instances be contact between the double-thickness outer regions of the two mating flanges at a joint. In addition to the advantages previously described, this construction would facilitate maintaining alignment of the duct sections. If there was no contact between the outer regions of the mating flanges, the tightening of the screws s that connect the mating flanges together could pull one of the duct sections DS out of axial alignment with the other. That is, the installer may install a first screw s on one side of the joint and in the process compress the seal ring so as to swing the two mating flanges together at the location of the screws s and at the same time swing apart the portions of the mating flanges at the diametrically opposite location. When all of the screws s are installed, they may compress the seal ring more, and bring the mating flanges closer together, on one side of the ducting than on the other. With a construction that provides contact between the outer regions of the mating flanges, the screws s can be progressively tightened until this contact occurs. Then, they can be tightened an additional amount for making a firm connection at the joint.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. In a method of spin forming a cylindrical sheet metal workpiece, to form a sheet metal connector ring for sheet metal ducting, by using a mandrel that has an open center, a generally radial forming surface surrounding the open center, and an outer diameter, wherein a first end portion of the workpiece is positioned in the open center of the mandrel, and is secured to the mandrel, and a second end portion of the workpiece projects axially outwardly from the center opening in the mandrel and has an outer end part, and wherein the mandrel and the workpiece are spun together about a common spin axis and the second end portion of the workpiece is progressively stretched in diameter and moved radially outwardly along the generally radial forming surface of the mandrel by a first forming tool, the improvement comprising;

rotating the mandrel and workpiece and using the first forming tool to stretch the second end portion of the workpiece and move it radially outwardly on said radial forming surface until the outer end part of the second end portion of the workpiece becomes spaced generally axially from the radial forming surface substantially at the outer diameter of the mandrel;

continuing to rotate the mandrel and the workpiece and moving a second forming tool against the outer end part of the second end portion of the workpiece, and using said second forming tool to curl the outer end part radially inwardly and move it substantially against an adjoining radial part of the second end portion of the workpiece that is in contact with the radial forming surface on the mandrel; and removing the formed workpiece from the mandrel to serve as a connector ring having a radial flange at a first end and a cylindrical flange at a second end, wherein said radial flange has an outer marginal portion with a rounded outer edge.

2. The method of claim 1, further comprising using the second forming tool to press the outer end part of the second end portion of the workpiece flat against the adjoining radial part of the second end portion of the workpiece.

3. The method of claim 1, further comprising providing a first forming tool that includes a roller having a center axis; mounting the first forming tool for free rotation of the roller about its center axis; providing the roller with a convex face; placing the roller inside the second end portion of the workpiece, with its convex face directed towards the second end portion of the workpiece; and moving the roller along a radial path that is within a plane that includes the spin axis of the mandrel and the center axis of the roller, whereby as it moves the roller progressively stretches the second end portion of the workpiece and progressively forces it against the generally radial forming surface on the mandrel.

4. The method of claim 3, comprising providing a support arm for the first forming tool; pivotally connecting a lower end of the support arm to a support, for pivotal movement about a pivot axis that extends perpendicular to the center axis of the roller; mounting the roller onto the support arm at a location spaced from said pivot axis; and swinging the support arm about the pivot axis to place the roller inside of the second end portion of the workpiece and in position to contact the second end portion of the workpiece and stretch it and force it against the radial forming surface of the mandrel as the roller is being moved along said radial path.

5. The method of claim 1, comprising mounting the mandrel for rotation about a spin axis that extends substantially vertically, placing the generally radial forming surface in a plane that extends substantially horizontally.

6. The method of claim 5, further comprising providing a first forming tool that includes a roller that has a substantially horizontal center axis; mounting the roller for free rotation about its center axis; providing the roller with a convex face; placing the roller inside the second end portion of the workpiece, with its convex face directed towards the second end portion of the workpiece; and moving the roller along a path that extends radially of the mandrel and workpiece, progressively stretching the second end portion of the workpiece and progressively forcing it against the generally radial forming surface on the mandrel, as said roller moves along said workpiece.

7. The method of claim 6, comprising providing a support arm for the roller; pivotally connecting a lower end of the support arm to a support frame, for pivotal movement about a substantially horizontal pivot axis that extends perpendicular to the center axis of the roller; mounting the roller on the support arm at a location spaced from and above said pivot axis; and swinging the support arm about the pivot axis to place the roller inside the second end portion of the workpiece and in position to contact the second end portion of the workpiece and stretch it and force it against the radial forming surface of the mandrel as the roller is moved radially along the workpiece.

8. The method of claim 7, comprising moving the support for the support arm for moving the support arm and the roller relative to the second end portion of the workpiece.

9. The method of claim 1, comprising mounting the first forming roller for movement towards and away from the generally radial forming surface on the mandrel; and spring biasing the roller towards the radial forming surface.

10. The method claim 1, comprising providing a second forming tool that includes a roller that has a center axis and a cam surface surrounding the center axis; and moving the second forming tool so as to contact the outer part of the second end portion of the workpiece, and move it radially inwardly and axially towards an adjoining radial part of the second end portion of the workpiece that is in contact with the radial forming surface on the mandrel.

11. The method of claim 10, comprising mounting the roller of the second forming tool on a movable support, for rotation about the center axis of said roller, and moving the support towards the mandrel and workpiece to move the cam surface of the roller against the outer end part of the second end portion of the workpiece.

12. The method claim 11, comprising providing a support in the form of a swing arm; mounting one end of the swing arm for rotation about a swing axis; mounting the roller on an opposite end of the swing arm for rotation about an axis that is parallel to the swing axis; and swinging the swing arm towards the mandrel and workpiece to move a cam surface of the roller against the outer end part of the second end portion of the workpiece.

13. In a method of spin forming a cylindrical sheet metal workpiece, to form a sheet metal connector ring for sheet metal ducting, by using a mandrel that has an open center, a generally radial forming surface surrounding the open center, and an outer diameter, wherein a first end portion of the workpiece is positioned in the open center of the mandrel, and is secured to the mandrel, and a second end portion of the workpiece projects axially outwardly from the center opening in the mandrel and has an outer end part, and wherein the mandrel and the workpiece are spun together about a common spin axis and the second end portion of the workpiece is progressively stretched in diameter and moved radially outwardly along the generally radial forming surface of the mandrel by a forming roller, the improvement comprising:

mounting the mandrel for rotation about a substantially vertical spin axis with its generally radial forming surface in a substantially horizontal plane;

mounting the forming roller for rotation about an axis that is in a common radial plane with the spin axis of the mandrel;

providing the roller with a convex face and a periphery;

placing the roller inside the second end portion of the workpiece, with its convex face directed radially outwardly towards the second end portion of the workpiece and its periphery directed downwardly;

spring biasing the roller downwardly when it is inside the second end portion of the workpiece, to place its periphery initially below the level of the radial forming surface;

spinning the mandrel and the workpiece around the spin axis of the mandrel;

moving the roller radially outwardly of the mandrel and its convex face against the second end portion of the workpiece, so as to radially stretch the second end portion of the workpiece as the roller moves radially outwardly;

positioning the periphery of the roller where it will press the second end portion of the workpiece against the generally radial forming surface as it moves radially outwardly, whereby as the roller moves radially outwardly its contact with the second end portion of the workpiece will move the roller upwardly against the spring bias, allowing the second end portion of the workpiece to move radially outwardly along the radial forming surface, between the periphery of the roller and the radial forming surface; and continuing the radial outward movement of the roller against the second end portion of the workpiece at least until a predetermined amount of the second end portion of the workpiece is against the radial forming surface below and behind the roller and a remainder of the second end portion of the workpiece is forwardly of the roller against its convex face.

14. The method of claim 13, comprising rotating the mandrel and using the roller to stretch the second end portion of the workpiece and move it radially outwardly on said radial forming surface until the outer end part of the second end portion of the workpiece becomes spaced generally axially from the radial forming surface substantially at the outer diameter of the mandrel;

continuing to rotate the mandrel and the workpiece and moving an edge forming tool against the outer end part of the second end portion of the workpiece and using said tool to curl the outer end part radially inwardly and substantially against an adjoining part of the second end portion of the workpiece that is in contact with the radial forming surface on the mandrel; and removing the formed workpiece from the mandrel to serve as a connector ring having a radial flange at a first end and a cylindrical flange at a second end, wherein said radial flange has a double-thickness outer marginal portion with a rounded outer edge.

15. The method of claim 13, comprising providing a support in the form of a swing arm; mounting one end of the swing arm for rotation about a generally vertical swing axis; mounting the edge forming roller on the swing arm for free rotation about an axis that is parallel to the swing axis; and swinging the swing arm towards the mandrel and workpiece to move a cam surface on the edge forming roller against the outer end part of the second end portion of the workpiece whereby the outer end part of the second end portion of the workpiece is moved radial inwardly and substantially against the adjoining part of the second end portion of the workpiece that is in contact with the radial forming surface on the mandrel.

* * * * *